March 27, 1951  S. WONENBERG  2,546,576
TRACTOR PHOSPHATE AND LIME DISTRIBUTOR
Filed July 25, 1947  3 Sheets-Sheet 1

Samuel Wonenberg,
INVENTOR.

BY
McMorrow, Berman & Davidson
ATTORNEYS

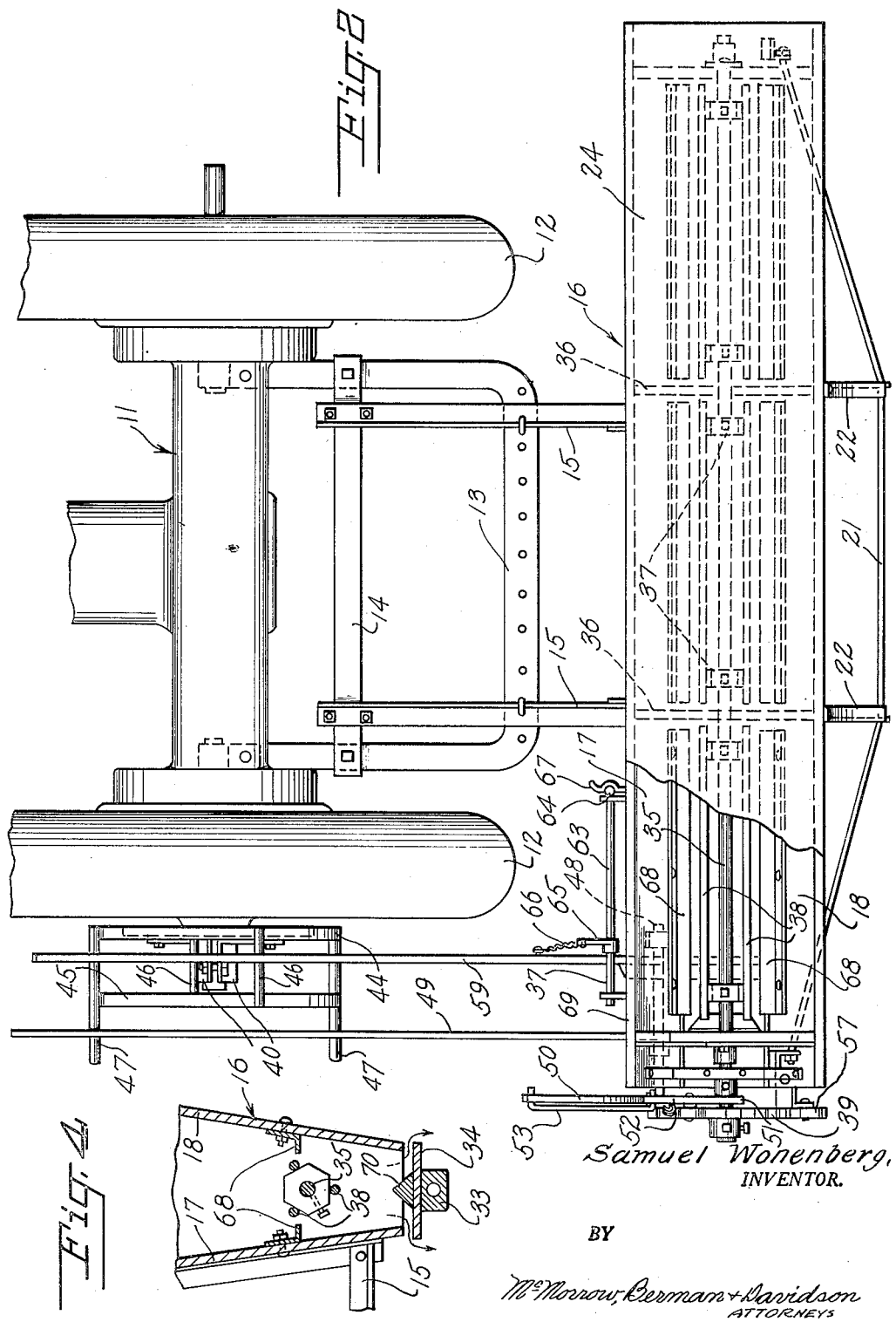

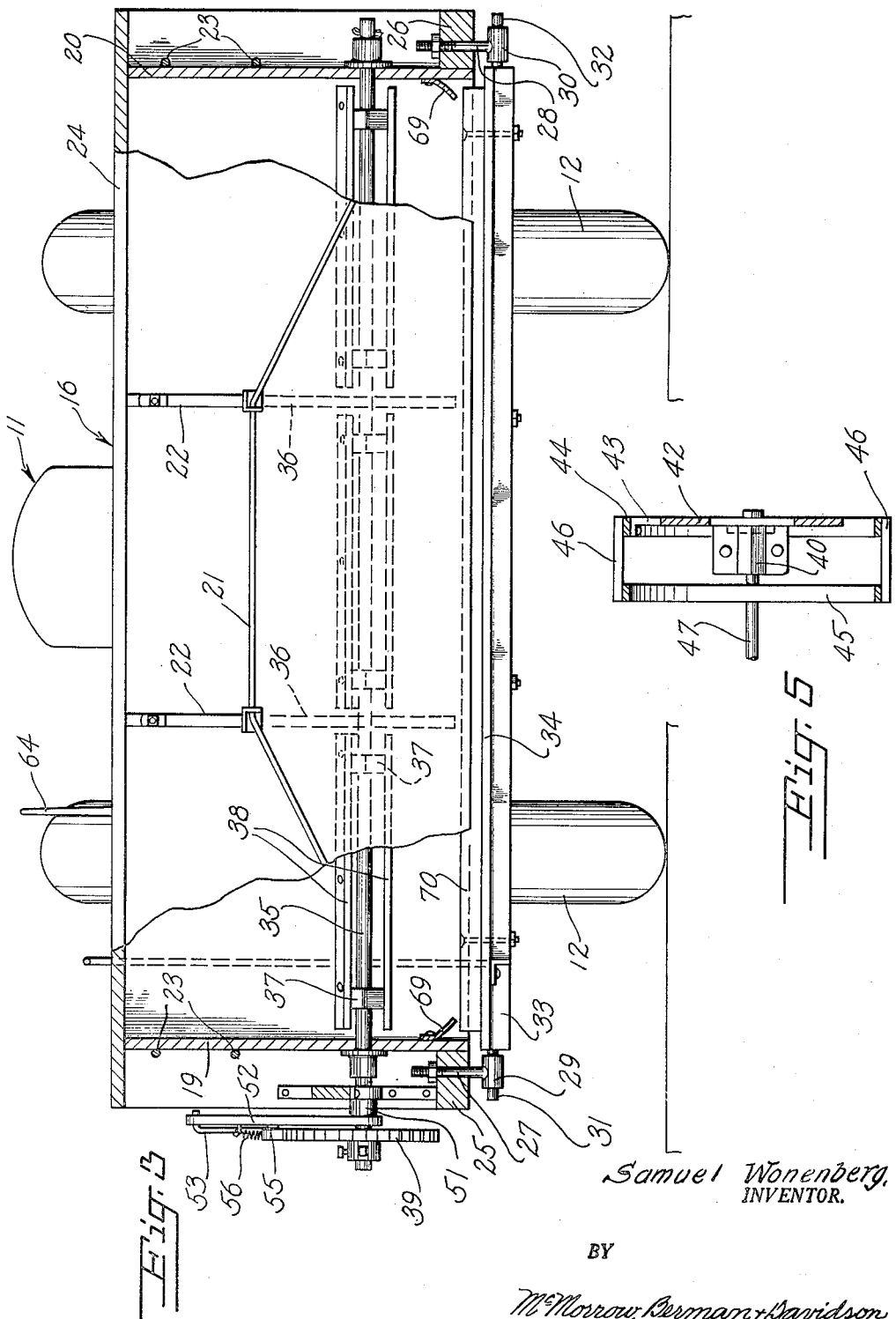

Patented Mar. 27, 1951

2,546,576

UNITED STATES PATENT OFFICE 2,546,576

TRACTOR PHOSPHATE AND LIME DISTRIBUTOR

Samuel Wonenberg, Buhl, Idaho

Application July 25, 1947, Serial No. 763,676

4 Claims. (Cl. 275—9)

This invention relates to material spreaders and more particularly to a tractor attachment for distributing phosphate, lime and other dry granular materials.

A main object of the invention is to provide a novel and improved granular material distributing attachment for tractors which is very simple in construction, easy to install and efficient in operation.

A further object of the invention is to provide an improved distributing apparatus adapted to be installed on a conventional tractor, said apparatus being inexpensive to build, sturdy in construction and being especially suited for distributing phosphate, lime and dry insecticides such as calcium arsenate and the like.

Further objects and advantages of the invention will become apparent from the following description and claims, and from the accompanying drawings, wherein:

Figure 2 is a top plan view, partly broken away, of the distributing apparatus of Figure 1.

Figure 3 is a rear elevational view, partly in cross-section of the distributing apparatus of Figure 1.

Figure 4 is a cross-sectional detail view taken transversely through the hopper portion of the distributing apparatus of Figure 1.

Figure 5 is a cross-sectional detail view taken on line 5—5 of Figure 1.

Figure 1:
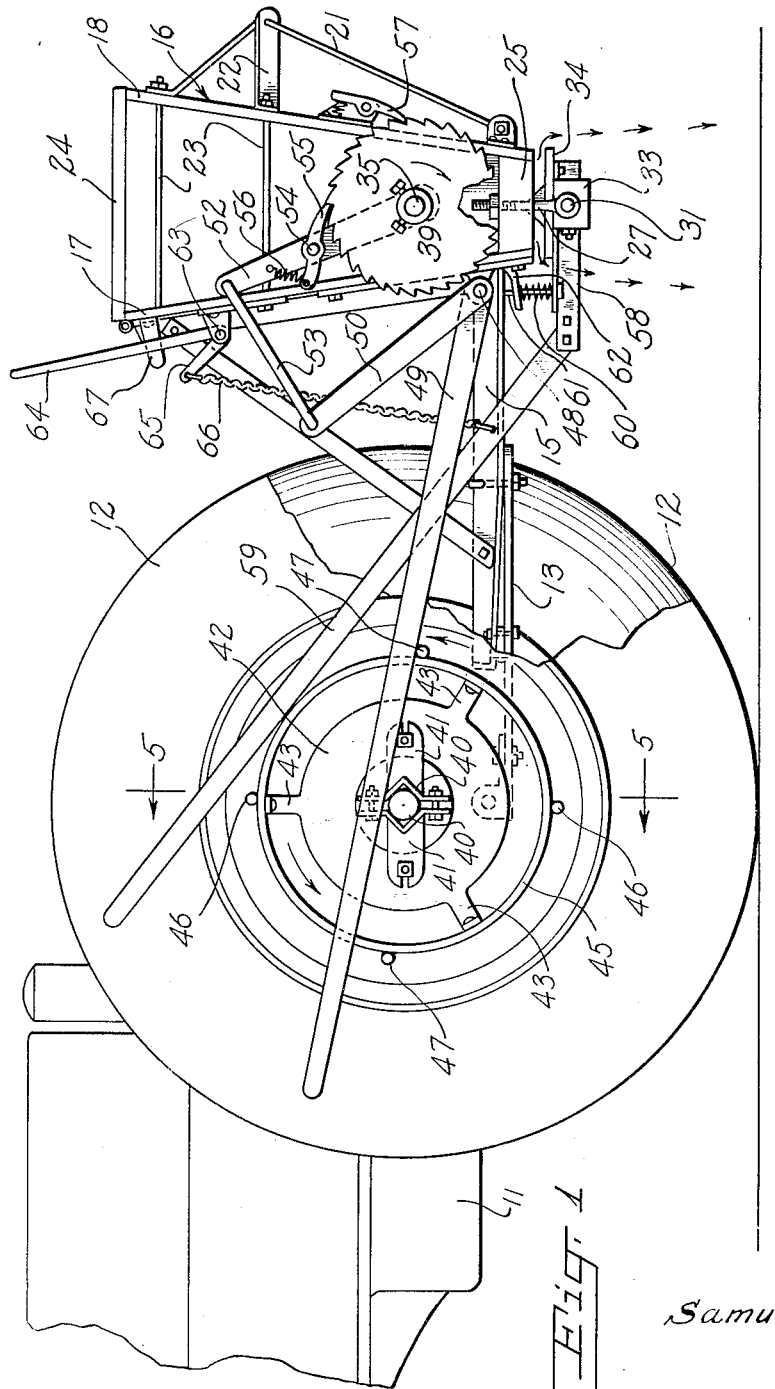
Figure 1 is a side elevational view with parts broken away of a tractor-mounted distributing apparatus constructed in accordance with the present invention.

Referring to the drawings, 11 designates a conventional tractor having rear wheels 12, 12 and having a U-shaped drawbar 13 projecting rearwardly from the tractor frame. Secured to the side arms of the drawbar 13 is a transverse bar member 14 and secured to said bar member 14 and the transverse rear arm of the U-shaped drawbar 13 are parallel rearwardly extending angle bars 15, 15 to the ends of which is rigidly secured a transversely extending trough-like hopper 16. Hopper 16 has upwardly flaring main transversely extending walls 17 and 18 and vertical end walls 19 and 20 and extends laterally of the tractor on both sides thereof substantially beyond the longitudinal planes of the wheels 12, 12. The rear wall 18 of the hopper is stiffened by a brace rod 21 which is connected to the bottom corners of said wall and passes through the rearwardly projecting ends of a pair of spaced L-shaped brackets 22, 22 secured to the upper intermediate portion of wall 18 symmetrically with respect to the center of said upper wall portion, thereby providing a stiffening truss for the wall. The interior of the hopper 16 is braced at its ends by tie bars 23 connecting the main walls 17 and 18 thereof at suitably vertically spaced points thereon. Hinged to the top edge of wall 17 is a cover 24.

Secured to the lower portions of the walls 17 and 18 externally adjacent the respective end walls 19 and 20 are respective blocks 25 and 26 and passing through apertures in said blocks are vertical bolt members 27 and 28 carrying respective transversely aligned bearing sleeves 29 and 30 at their bottom ends. The top ends of the bolt members have nuts threaded thereon which bear on the respective block members 25 and 26.

Journaled in bearing sleeves 29 and 30 are the end trunnions 31 and 32 projecting from a bar 33 on which is secured a plate member 34 which underlies the open bottom end of the hopper 16 and may oscillate with respect to said open bottom by virtue of the pivotal relation of trunnions 31 and 32 with the bearing sleeves 29 and 30. The spacing of plate member 34 with respect to the open bottom of the hopper may be regulated by adjusting the supporting nuts threaded on the bolt members 27 and 28.

Journaled in the end walls 19 and 20 of hopper 16 is a shaft 35. The hopper has intermediate walls 36 defining a plurality of compartments therein and shaft 35 passes rotatably through said intermediate walls. In each of the compartments thus defined a pair of hexagonal blocks 37, 37 are secured to shaft 35, and secured to alternate faces of said blocks are agitator bars 38 extending substantially for the lengths of the respective compartments. The end of shaft 35 protrudes a substantial distance beyond end wall 19 and secured to the shaft end is a ratchet wheel 39.

Engaging the end of the rear wheel axle of the tractor on the same side thereof as the ratchet wheel 39 and rigidly clamped to said axle are opposed bracket members 40, 40 having opposed projecting arms 41, 41. Secured to said arms 41, 41 is an annular disc member 42 from the periphery of which extends three equally spaced fingers 43. Secured to said fingers substantially concentrically with said disc member 42 is an annular ring 44. A similar annular ring 45 is connected in spaced parallel relation to ring 44 by the peripheral connecting bars 46, 46 and 47, 47 welded or otherwise rigidly secured to the spaced annular rings 44 and 45. Bars 46, 46 are diametrically opposed and are relatively short, said bars terminating at the opposed outer planes of the annular rings. Bars 47, 47 are also diametrically opposed and are spaced 90 degrees with respect to the respective bars 46, 46 on said rings. Bars 47, 47 are relatively long and extend a substantial distance beyond the plane of ring 45, as shown in Figure 2.

Journaled to the lower portion of hopper wall 17 externally of the hopper is a transverse shaft 48 and secured to said shaft is a lever 49 located in a longitudinal vertical plane outwardly adjacent to the plane of the outer annular ring 45, so that lever 49 is engageable with the longer connecting bars 47, 47. Also secured to shaft 48 is an arm 50. Rotatably engaged with shaft 35 is a sleeve member 51 carrying an upwardly extending arm 52. The end of arm 52 is connected to the end of arm 50 by a link bar 53. Pivoted to the intermediate portion of arm 52 at 54 is a pawl lever 55 one end of which engages the toothed periphery of ratchet wheel 39. A spring 56 connects the other end of pawl lever 55 to the upper portion of arm 52, thereby biasing the pawl lever into engagement with the ratchet wheel. A similar spring biased pawl lever 57 is mounted on the rear wall 18 of the hopper and engages the ratchet wheel 39 to prevent retrograde rotation thereof.

As can be seen from Figure 1, forward movement of tractor 11 causes the annular disc 42 to rotate and thereby rotates the diametrically opposed bars 47, 47. The lever 49 is thereby caused to oscillate once for each half revolution of the annular disc 42. The oscillation of lever 49 is transmitted by shaft 48, arm 50, link 53 and arm 52 to the pawl lever 55, causing the ratchet wheel 39 to be advanced by a predetermined angle of revolution for each oscillation of the arm 49. This in turn rotates the shaft 35 and the agitator bars 38 carried on the hexagonal spacers 37. The rotation of the bars 38 breaks up lumps of the granular material in the hopper and facilitates the downward feeding of the crushed material toward the bottom plate member 34.

Secured rigidly to bar 33 and the bottom surface of plate member 34 sub-adjacent to the end block 25 is a forwardly extending arm 58 to the end of which is rigidly connected an upwardly and forwardly extending lever member 59. Lever member 59 is located in a longitudinal vertical plane between the planes of the annular rings 44 and 45 so that said lever member is engageable with the bars 46, 46 and 47, 47. Arm 58 is biased downwardly by a spring 60, said spring encircling a vertical pin 61 carried by arm 58 and bearing between said arm and an apertured lug 62 secured to the lower portion of hopper wall 17 and through which pin 61 slidably passes.

As can be seen from Figure 1, lever 59 is oscillated four times for each complete revolution of annular disc 42, causing the plate member 34 to oscillate on the trunnion bearings 29 and 30 an equal number of times. When the plate member 34 rocks clockwise, as viewed in Figure 1, granular material is fed out of the hopper off the rear edge of said plate member, and when said plate member rocks counterclockwise the material is fed out of the hopper off the front edge of said plate member. Since the plate member rocks at a relatively rapid rate as the tractor moves forwardly, the distribution of the material beneath the hopper is substantially uniformly distributed over the area traversed by the tractor.

Pivoted to the upper portion of hopper wall 17 is a shaft 63 to which is secured a hand lever 64.

Also secured to shaft 63 is an arm 65 whose end is connected by a chain 66 to the lever member 59. Lever member 59 may be raised to an inoperative position by rotating hand lever 64 upwardly. Said hand lever may be releasably locked in its raised position by interengaging it with a spring catch 67 secured to the upper portion of hopper wall 17. In the inoperative position of lever member 59 no distribution of material takes place since oscillator plate 34 is held stationary.

Secured to the inside surfaces of the hopper walls 17 and 18 adjacent and parallel to the cylindrical surfaces defined by the rotary paths of movement of the agitator bars 38 are inwardly directed baffle flange members 68, 68 to guide the material gravitating downwardly in the hopper into engagement with said agitator bars and to co-act with said bars to crush the material as the bars rotate past said flange members.

Secured to the inside surfaces of the end walls 19 and 20 at their lower end portions are downwardly and inwardly inclined baffle plates 69, 69 to prevent excessive leakage of material off the end edges of the oscillator plate 34.

Secured to the plate 34 and extending substantially for the full length of said plate below the hopper opening is a tapered ridge member 70 which guides the crushed material toward the respective plate edges as said plate is oscillated.

While a specific embodiment of a granular material distributing attachment for a tractor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A spreading apparatus for granular material comprising a hopper, means securing said hopper to a tractor frame, the bottom of said hopper being open, a plate member underlying said open bottom, means rockably supporting said plate member, a shaft journaled in said hopper, an agitating structure mounted on said shaft, a disc member secured to one of the rear axles of the tractor, a pair of spaced disc rings carried by said disc member concentrically therewith, a plurality of pairs of bar elements of unequal length connecting the peripheries of said rings, a first lever member engaging said bar elements, means securing said first lever member to the plate member, a second lever member pivoted to the hopper and engaging the pairs of bar elements of greater length, pawl and ratchet means positioned exteriorly of said hopper and operatively connected to said shaft, and connecting linkage means operatively connecting said second lever member to said pawl and ratchet means to rotate said shaft in response to the movement of said second lever member, whereby said plate member will be rocked and said shaft will be rotated simultaneously responsive to movement of the tractor.

2. A spreading apparatus for granular material comprising a hopper, means securing said hopper to a tractor frame, the bottom of said hopper being open, a plate member underlying said open bottom, means rockably supporting said plate member, a shaft journaled in said hopper, an agitating structure mounted on said shaft, a disc member secured to one of the rear axles of the tractor, a pair of spaced rings carried by said disc member co-axially therewith, a first set of bar elements connecting the peripheries of said spaced rings, a second set of bar elements connecting said peripheries and alternating with the bar elements of the first set, said second set projecting substantially beyond said first set, a first lever engaging said bar elements, means rigidly connecting said first lever to the plate member, a second lever pivoted to the hopper and engaging only the second set of bar elements, pawl and ratchet means positioned exteriorly of said hopper and operatively connected to said shaft, and connecting linkage means operatively connecting said second lever member to said pawl and ratchet means to rotate said shaft in response to the movement of said second lever member, whereby said plate member will be rocked and said shaft will be rotated simultaneously and in a predetermined relation responsive to movement of said tractor.

3. A spreading apparatus for granular material comprising a hopper having an open bottom, means securing said hopper to a tractor frame, a plate member, means rockably supporting said plate member in underlying relationship to said open bottom, a shaft journaled in said hopper, an agitating structure mounted on said shaft, a ratchet wheel carried by said shaft, a disc member secured to one of the rear axles of the tractor, a pair of spaced rings carried by said disc member co-axially therewith, a first set of bar elements connecting the peripheries of said rings, a second set of bar elements connecting said peripheries and alternating with the bar elements of the first set, said second set projecting substantially beyond said first set, a first lever engaging said bar elements, means rigidly connecting said first lever to the plate member, a second lever pivoted to the hopper and engaging only the second set of bar elements, pawl means engaging said ratchet wheel, and connecting linkage means operatively connecting said pawl means to said second lever for rotating the ratchet wheel responsive to oscillation of said second lever, whereby said plate member will be rocked and said shaft will be rotated simultaneously and in a predetermined relation responsive to movement of said tractor.

4. A spreading apparatus for granular material comprising a hopper, means securing said hopper to a tractor frame, the bottom of said hopper being open, a plate member underlying said open bottom, means rockably supporting said plate member, a shaft journaled in said hopper, an agitating structure mounted on said shaft, a disc member secured to one of the rear axles of the tractor, a pair of spaced rings carried by said disc member concentric therewith, a plurality of pairs of bar elements of unequal length connecting the peripheries of said rings, a first lever member engaging said bar elements, means securing said first lever member to the plate member, a second lever member pivoted to the hopper and engaging the pairs of bar elements of greater length, pawl and ratchet means positioned exteriorly of said housing and operatively connected to said shaft, connecting linkage means operatively connecting said second lever member to said pawl and ratchet means to rotate said shaft in response to the movement of said second lever member, whereby said plate member will be rocked and said shaft will be rotated simultaneously responsive to the movement of the tractor, and hand actuable means pivotally supported on said hopper and operatively connected to said first lever member for rocking said first lever member out of engagement with the pairs of bar elements of lesser length.

SAMUEL WONENBERG.

REFERENCES CITED

The following references are of record in the file of this patent:

UNITED STATES PATENTS

| Number | Name | Date |
| --- | --- | --- |
| 660,600 | Taplin | Oct. 30, 1900 |
| 683,903 | Brewer | Oct. 8, 1901 |
| 740,536 | Coble | Oct. 6, 1903 |
| 977,290 | Frennet | Nov. 29, 1910 |
| 1,036,922 | Smith | Aug. 27, 1912 |
| 2,350,107 | Gandrud | May 30, 1944 |